(12) United States Patent
Onizawa

(10) Patent No.: US 6,403,713 B2
(45) Date of Patent: Jun. 11, 2002

(54) METHOD FOR CROSSLINKING OF ISOPRENE-ISOBUTYLENE RUBBER, ETHYLENE-PROPYLENE-DIENE RUBBER CONTAINING ETHYLIDENENORBORNENE AS UNSATURATED COMPONENT, OR MIXTURE THEREOF; AND CROSSLINKED RUBBER PRODUCT OBTAINED BY SAID METHOD

(76) Inventor: Masao Onizawa, 2-111-3, Owada-cho, Omiya-shi, Saitama-ken (JP)

( * ) Notice: Subject to any disclaimer, the term of this patent is extended or adjusted under 35 U.S.C. 154(b) by 0 days.

(21) Appl. No.: 09/782,312

(22) Filed: Feb. 14, 2001

(30) Foreign Application Priority Data

Feb. 16, 2000 (JP) ......................................... 2000-038283

(51) Int. Cl.[7] .......................... C08L 9/00; C08L 23/16; C08K 5/3472
(52) U.S. Cl. ...................... 525/133; 525/134; 525/138; 525/141; 525/331.7; 525/332.5; 524/106
(58) Field of Search ................................. 525/133, 134, 525/138, 141, 331.7, 332.5; 524/106

(56) References Cited

U.S. PATENT DOCUMENTS 4,140,818 A * 2/1979 Dave

FOREIGN PATENT DOCUMENTS

JP 02-219841 * 9/1990

* cited by examiner

Primary Examiner—David J. Buttner

(57) ABSTRACT

The present invention provides a novel improved method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, which method comprises thermally crosslinking the above rubber or rubber mixture using an alkylphenol-formaldehyde resin, 3-(N-salicyloyl)amino-1,2,4-triazole and, as necessary, a hydrazide compound. The method can produce a crosslinked rubber product low in compression set and corrosivity to metals, without using any halogen compound as a crosslinking co-agent.

16 Claims, 6 Drawing Sheets

METHOD FOR CROSSLINKING OF ISOPRENE-ISOBUTYLENE RUBBER, ETHYLENE-PROPYLENE-DIENE RUBBER CONTAINING ETHYLIDENENORBORNENE AS UNSATURATED COMPONENT, OR MIXTURE THEREOF; AND CROSSLINKED RUBBER PRODUCT OBTAINED BY SAID METHOD

BACKGROUND OF THE INVENTION (1) Field of the Invention

The present invention relates to a method for crosslinking an isoprene-isobutylene rubber (hereinafter referred to as butyl rubber), a particular ethylene-propylene-diene rubber (ethylene-propylene-diene rubber is hereinafter referred to as EPDM), i.e. an ethylene-propylene-diene rubber containing ethylidenenorbornene as an unsaturated component (this rubber is hereinafter referred to as ENB type EPDM), or a mixture of a butyl rubber and an ENB type EPDM, using an alkylphenol-formaldehyde resin and a particular triazole compound; as well as to a crosslinked rubber product obtained by the above crosslinking method.

The present invention relates further to a method for crosslinking a butyl rubber, an ENB type EPDM or a mixture of a butyl rubber and an ENB type EPDM, using an alkylphenol-formaldehyde resin, a particular triazole compound and a hydrazide compound; as well as to a crosslinked rubber product obtained by the above crosslinking method.

(2) Description of the Prior Art

Butyl rubber is a known synthetic rubber produced by copolymerization of isoprene and isobutylene, having an unsaturation degree of 0.5 to 3.0 mole %. Crosslinked butyl rubber has low gas permeability, weather resistance, electrical insulation, heat resistance, damping property, resistance to acids and alkalis, low water absorption, etc. and is in use in rubber stopper, o-ring, packing, curing bag, tank lining, coating of electric wire, hose, automobile tube, rubber vibration insulator, etc.

For crosslinking of butyl rubber, there have been known three methods, i.e. sulfur crosslinking, quinoid crosslinking and resin crosslinking.

Sulfur crosslinking is conducted using sulfur together with a crosslinking accelerator such as thiuram, thiazole or the like, and is in wide use when a butyl rubber is produced into a rubber hose, a rubber vibration insulator, a tube for bicycle or automobile, etc.

Quinoid crosslinking is conducted using quinone dioxime or benzoylquinone dioxime together with red lead or lead dioxide, and is suited for continuous crosslinking of coated electric wire in which a high crosslinking rate is required.

Resin crosslinking is conducted using an alkylphenol-formaldehyde resin together with an inorganic halogen compound (e.g. tin chloride or ferrous chloride) or a halogen-containing elastomer (e.g. chloroprene rubber or chlorosulfonated polyethylene), or using a halogenated alkylphenol-formaldehyde resin, and is suited when a butyl rubber is produced into, for example, a curing bag used in tire production. This resin crosslinking can produce a crosslinked butyl rubber of low compression set, but corrodes the mold used because a halogen compound is used in the resin crosslinking.

EPDM is a terpolymer of ethylene, propylene and a diene and, as the third component diene, there is used 1,4-hexadiene, ethylidenenorbornene or the like. In the present invention, there is used an EPDM containing ethylidenenorbornene as an unsaturated component, i.e. an ENB type EPDM.

ENB type EPDM is a known synthetic rubber superior in heat resistance, electrical insulation and weather resistance. For crosslinking of ENB type EPDM, there are known four methods, i.e. organic peroxide crosslinking, sulfur crosslinking, quinoid crosslinking and resin crosslinking.

Sulfur crosslinking, similarly to the sulfur crosslinking for butyl rubber, is conducted using sulfur together with a crosslinking accelerator such as thiuram, thiazole or the like and gives a cured product having superior weather resistance. Therefore, this sulfur crosslinking is in wide use when gaskets for automobile or construction, roofing sheets, etc. are produced.

Organic peroxide crosslinking can give a cured product of low compression set and therefore is in wide use when industrial rubber products such as packing and the like are produced.

Quinoid crosslinking is conducted using quinone dioxime or benzoylquinone dioxime together with red lead or lead dioxide. This crosslinking is introduced in books regarding rubber technology, but is in substantially no use in industrial production of an ENB type EPDM into a rubber product.

Resin crosslinking is conducted using an alkylphenol-formaldehyde resin together with an inorganic halogen compound (e.g. tin chloride or ferrous chloride) or a halogen-containing elastomer (e.g. chloroprene rubber or chlorosulfonated polyethylene), or using a halogenated alkylphenol-formaldehyde resin. However, rubber products obtained by subjecting an ENB type EPDM to this resin crosslinking using a halogen compound together, find substantially no application.

In resin crosslinking of a butyl rubber or an ENB type EPDM is conducted using an alkylphenol-formaldehyde resin, an organic or inorganic halogen compound is used together. This resin crosslinking using a halogen compound, however, corrodes the mold used and finds substantially no practical application. When a butyl rubber or an ENB type EPDM is crosslinked using an alkylphenol-formaldehyde resin alone and no halogen compound, the crosslinking rate is low.

Crosslinking of, in particular, ENB type EPDM using an alkylphenol-formaldehyde resin alone is unstable. When such crosslinking is tried for a compound containing a large amount of clay as a filler, the crosslinking proceeds very slowly or no crosslinking takes place, making it impossible to produce a crosslinked rubber product.

Butyl rubber and ENB type EPDM are compatible with each other and can be mixed at any proportions. Therefore, they can be crosslinked (co-crosslinked) using a common crosslinking agent and a cured product retaining the properties of the individual rubbers can be obtained. However, a mixture of a butyl rubber and an ENB type EPDM is crosslinked using an alkylphenol-formaldehyde resin alone and no halogen compound, the ENB type EPDM is not sufficiently crosslinked; therefore, it is impossible to obtain a rubber product having good crosslinked rubber properties.

Mixing of two different rubbers is generally conducted by those skilled in the art, in order to impart the properties of one rubber into other rubber. In this case, use of a common crosslinking agent is a common knowledge.

In crosslinking a mixture of two different rubbers using a crosslinking agent which is effective only to either one rubber, the effect of the crosslinking agent to the other rubber need be considered and the properties of the crosslinked rubber obtained are difficult to predict in many cases. Therefore, such crosslinking is hard to employ on an industrial scale.

When a mixture of a butyl rubber and an ENB type EPDM is co-crosslinked by those skilled in the art, it is generally conducted by sulfur crosslinking. This sulfur crosslinking is effective, for example, when an ENB type EPDM is mixed into a butyl rubber hose or when a butyl rubber is mixed into an ENB type EPDM-made roofing sheet to improve the adhesivity of the ENB type EPDM, and can prevent heat-softening of butyl rubber during sulfur crosslinking; however, the sulfur crosslinking is unsuitable when the crosslinked rubber is used for applications such as packing (which requires a low compression set) and the like.

Co-crosslinking of a mixture of a butyl rubber and an ENB type EPDM using a phenolic resin alone and no halogen compound has little practical applicability, because the ENB type EPDM is not crosslinked often and the cured product obtained has no intended properties.

By mixing a butyl rubber into an ENB type EPDM at an ENB type EPFM proportion of at least 50%, the properties of the butyl rubber can be imparted to the ENB type EPDM. That is, improvements are obtained in the adhesion between crosslinked and uncrosslinked rubbers, reduction in gas permeability, flow of compound during rubber molding, and tear strength at high temperatures, correspondingly to the mixing ratio of the two rubbers. This is a specific case in which the adhesivity, low gas permeability and excellent tear strength at high temperatures, possessed by the butyl rubber are imparted to the ENB type EPDM.

By mixing an ENB type EPDM into a butyl rubber at a butyl rubber proportion of at least 50%, the properties of the ENB type EPDM can be imparted to the butyl rubber. Specifically, the mixture can have a sufficient hardness and can be free from softening, at ambient temperatures of 80° C. or more; and an uncured rubber compound free from sticking can be obtained.

In producing those packings requiring steam resistance, water resistance, alkali resistance, acid resistance and heat resistance, a crosslinked rubber is usable which is obtained by crosslinking a butyl rubber, an ENB type EPDM or their mixture. This crosslinked rubber must also have a low compression set. As rubber products for which such properties are required, there are mentioned, for example, a packing for high-pressure steam sterilizer, a packing used at the joint of a high-pressure steam pipe, and a sealing rubber for capacitor. These rubber products, when used in contact with a metal, must also have no corrosivity to the metal, as an important property.

Sulfur crosslinking, however, is unable to give a crosslinked rubber product having an excellent (very low) compression set. In addition, the crosslinked rubber product obtained by sulfur crosslinking, when in contact with a metal (e.g. copper) reactive with sulfur, corrodes the surface of the metal.

Crosslinking using an organic peroxide can crosslink ENB type EPDM, but softens butyl rubber.

Quinoid crosslinking is usable for crosslinking of butyl rubber, ENB type EPDM or their mixture. However, this crosslinking is not preferred because it tends to cause early crosslinking (scorching) and the lead compound used together with quinoid has a problem of environmental pollution.

Resin crosslinking uses a halogen compound as a crosslinking co-agent and can give a crosslinked rubber superior in heat resistance and compression set. In this crosslinking, however, the mold used is corroded and/or stained by the halogen compound used as a crosslinking co-agent. Therefore, the resin crosslinking is unsuitable when a rubber product such as packing or the like is produced. Butyl rubber can be crosslinked using an alkylphenol-formaldehyde resin alone and no halogen compound; however, the crosslinking rate is low. Moreover, with such crosslinking, it is impossible to produce a butyl rubber of high hardness or a crosslinked butyl rubber of high modulus. Meanwhile, crosslinking of ENB type EPDM using an alkylphenol-formaldehyde resin alone and no halogen compound is unstable and no crosslinking takes place often. Therefore, it is very difficult to produce a rubber product of practical usability by crosslinking an ENB type EPDM using an alkylphenol-formaldehyde resin alone and no halogen compound. Hence, if resin crosslinking requiring no halogen compound is developed, it becomes possible to produce, from a butyl rubber or an ENB type EPDM or their mixture of any proportions, a rubber product not corrosive to metals. It further becomes possible to produce a novel rubber product by mixing the above two rubbers and crosslinking the mixture according to the crosslinking method of the present invention.

SUMMARY OF THE INVENTION

The first object of the present invention is to provide a novel crosslinking method which comprises adding, to a butyl rubber, an ethylene-propylene-diene rubber containing ethylidenenorbornene as an unsaturated component (an ENB type EPDM), or a mixture of desired proportions of a butyl rubber and an ENB type EPDM, an alkylphenol-formaldehyde resin and a particular triazole compound, wherein no halogen compound is added.

The second object of the present invention is to provide a novel crosslinking method which comprises adding, to a butyl rubber, an ENB type EPDM, or a mixture of desired proportions of a butyl rubber and an ENB type EPDM, an alkylphenol-formaldehyde resin, a particular triazole compound and a hydrazide compound, wherein no halogen compound is added.

The third object of the present invention is to provide a method for phenolic resin crosslinking of a butyl rubber, an ENB type EPDM or their mixture, which can produce a crosslinked rubber without corroding the mold used in the crosslinking; and a crosslinked rubber product by the crosslinking method, which does not corrode metals such as copper alloy, aluminum and the like when used in contact with such metals and which has a high hardness and a good (low) compression set.

Other objects of the present invention will become apparent from the following description.

The above objects of the present invention are achieved by a method for crosslinking a butyl rubber, an ENB type EPDM or a mixture of desired proportions of a butyl rubber and an ENB type EPDM, using an alkylphenol-formaldehyde resin and 3-(N-salicyloyl)amino-1,2,4-triazole; and a crosslinked rubber product produced by the above crosslinking method.

The objects of the present invention are also achieved by a method for crosslinking a butyl rubber, an ENB type EPDM or a mixture of desired proportions of a butyl rubber and an ENB type EPDM, using an alkylphenol-formaldehyde resin, 3-(N-salicyloyl)amino-1,2,4-triazole and a hydrazide compound; and a crosslinked rubber product produced by the above crosslinking method.

DETAILED DESCRIPTION OF THE INVENTION

The present invention is described in detail below.

As mentioned above, the butyl rubber used in the present invention is a known synthetic rubber produced by copolymerization of isoprene and isobutylene, having an unsaturation degree of 0.5 to 3.0 mole %. The butyl rubber of the present invention does not include any halogenated butyl rubber which is a chlorine- or bromine-added isoprene-isobutylene rubber.

The particular ethylene-propylene-diene rubber used in the present invention, that is, an ethylene-propylene-diene rubber containing ethylidenenorbornene as an unsaturated component (a diene component) (an ENB type EPDM) is an ethylene-propylene-diene terpolymer containing ethylidenenorbornene (ENB) as a diene component. The ENB type EPDM used in the present invention is a known synthetic rubber which is produced by copolymerizing ethylene, propylene and ethylidenenorbornene using a vanadium-based catalyst, an organoaluminum type catalyst, a metallocene catalyst or the like and which contains ethylidenenorbornene as the third component in an amount of generally 5 to 30 mole % (2 to 16 wt. %) as calculated from the iodine value and propylene in an amount of 8 to 50 mole %.

When a butyl rubber is allowed to have the properties of ENB type EPDM or when an ENB type EPDM is allowed to have the properties of butyl rubber, a butyl rubber and an ENB type EPDM may be mixed at appropriate proportions depending upon the intended purpose, and there is no restriction as to the mixing proportions. For example, in order to reduce the hardness of a butyl rubber at atmospheres of $^{\circ}$ C. or higher, an ENB type EPDM may be mixed into the butyl rubber at a proportion of about 5 to 30% by weight; in order to improve the tear strength of an ENB type EPDM at high temperatures of 170° C. or more (encountered during molding of a product of complicated shape using a mold), a butyl rubber may be mixed into the ENB type EPDM at a proportion of about 5 to 30% by weight. Thus, the mixing ratio can be varied easily.

The alkylphenol-formaldehyde resin used in the present invention is not critical and may be any alkylphenol-formaldehyde resin as long as it can be effectively used in the resin crosslinking of the present invention for butyl rubber, ENB type EPDM or their mixture. However, a methylol group-containing compound of relatively low molecular weight is preferred. There is preferred, for example, a mixture of low-molecular compounds each represented by the following general formula (1):

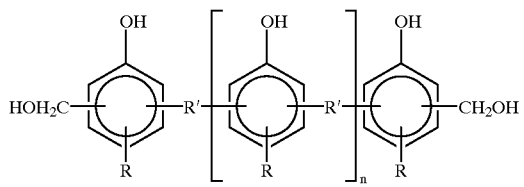

(1)

wherein n is 0 to 10, R is an aliphatic group having 1 to 10 carbon atoms, and R' is —CH$_2$— or —CH$_2$OCH$_2$—. Such compounds are commercially available as, for example, TACKIROL 201 (a product of Taoka Chemical Co., Ltd.) and HITANOL 2501 (a product of Hitachi Chemical Co., Ltd.).

The amount of the alkylphenol-formaldehyde resin added is 8 to 25 parts by weight, preferably 10 to 20 parts by weight per 100 parts by weight of the synthetic rubber component which is a butyl rubber, an ENB type EPDM or a mixture of desired proportions of a butyl rubber and an ENB type EPDM. When the amount is less than 8 parts by weight, no intended effect is obtained. When the amount is more than 25 parts by weight, the raw material compound obtained is very sticky, resulting in reduced operability. The objects of the present invention are achieved at the alkylphenol-formaldehyde resin amount of 25 parts by weight or less.

Use of a halogenated alkylphenol-formaldehyde resin wherein the methylol group or the benzene ring is substituted with halogen (e.g. bromine), is unsuitable for the objects of the present invention and is not included in the scope of the present invention.

The 3-(N-salicyloyl)amino-1,2,4-triazole used in the present invention is represented by the following formula (2).

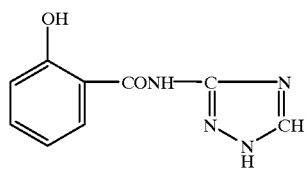

(2)

The amount of 3-(N-salicyloyl)-1,2,3-triazole used is 0.1 to 8 parts by weight, preferably 0.2 to 5 parts by weight per 100 parts by weight of the synthetic rubber component which is a butyl rubber, an ENB type EPDM or a mixture of desired proportions of a butyl rubber and an ENB type EPDM. When the amount is less than 0.1 part by weight, the addition effect is low. When the amount is more than 8 parts by weight, no additional effect is obtained and a sufficient effect can be obtained at an amount of 8 parts by weight or less.

In the present invention, it was found out that 3-(N-salicyloyl)amino-1,2,4-triazole exhibits a unique property of good crosslinking acceleratability in the alkylphenol-formaldehyde resin crosslinking for butyl rubber or ENB type EPDM; and the finding has led to the completion of the present invention.

3-Amino-1,2,4-triazole, which has a chemical structure very similar to that of 3-(N-salicyloyl)amino-1,2,4-triazole, shows no crosslinking acceleratability in the alkylphenol-formaldehyde resin crosslinking for butyl rubber or ENB type EPDM and causes foaming owing to the heat during crosslinking, making it impossible to obtain a crosslinked rubber. This indicates the unique property of the triazole compound of the present invention.

As the hydrazide compound usable in the present invention, there can be mentioned saturated or unsaturated aliphatic dibasic acid hydrazides; dibasic acid hydrazides having a hydantoin skeleton; phthalic acid hydrazides; hydrazide compounds obtained by a reaction of each one hydrogen atom of the two —NH$_2$ possessed by the above hydrazide compounds, with benzoic acid, o-, m- or p-toluylic acid or o-, m- or p-oxybenzoic acid; carbohydrazide; and so forth.

As specific examples of the hydrazide compound, there can be mentioned carbohydrazide, adipic acid dihydrazide, sebacic acid dihydrazide, dodecanedioic acid dihydrazide, isophthalic acid hydrazide, maleic acid hydrazide, decamethylenedicarboxylic acid disalicyloylhydrazide, eicosanedioic acid dihydrazide, 7,11-octadecadiene-1,18-dicarbohydrazide, and 1,3-bis(hydrazinocarboethyl)-5-isopropylhydantoin.

By using, in combination, the triazole compound of the present invention and the above hydrazide compound, the crosslinking rate of the alkylphenol-formaldehyde resin can be increased further; production of, in particular, a rubber product of high hardness becomes possible without increasing the amount of carbon black (a filler) used; and a compound of good moldability can be obtained.

The amount of the hydrazide compound used is 0.1 to 5 parts by weight, preferably 0.3 to 4 parts by weight (when hydrazide compounds of two or more kinds are used, the amount is their total amount), per 100 parts by weight of the synthetic rubber component which is a butyl rubber, an ENB type EPDM or a mixture of desired proportions of a butyl rubber and an ENB type EPDM. When the amount of the hydrazide compound used is less than 0.1 part by weight, the addition effect is low. When the amount is more than 5 parts by weight, no additional effect is obtained.

The hydrazide compound used in the present invention is described in more detail below.

The saturated or unsaturated aliphatic dibasic acid hydrazides used in the present invention are (a) dibasic acid hydrazides derived from saturated or unsaturated aliphatic dicarboxylic acids and (b) hydrazide compounds obtained by a reaction of each one hydrogen atom of the two —NH$_2$ possessed by the above dibasic acid hydrazides (a), with benzoic acid, o-, m- or p-toluylic acid or o-, m- or p-oxybenzoic acid, both the dibasic acid hydrazides (a) and the hydrazide compounds (b) being represented by the following general formula (3):

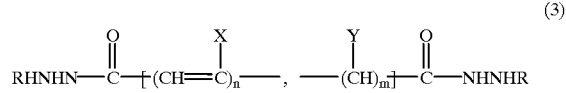

(3)

[wherein X and Y may be the same or different and are each a hydrogen atom or an alkyl group having 1 to 5 carbon atoms; R is a hydrogen atom or a group represented by

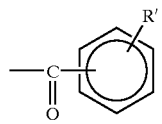

(wherein R' is a hydrogen atom, a methyl group or a hydroxyl group); n is a number of 0 to 2; and m is a number of 0 to 20 (n and m are not 0 simultaneously)]. In the formula (3), [ ] indicates that the bond

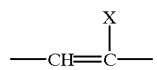

and the bond

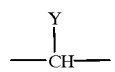

are combined at random.

In the following formulas (4) to (6) are shown the structural formulas of sebacic acid hydrazide (which is a saturated aliphatic dibasic acid hydrazide), 7,11-octadecadiene-1,18-dicarboxyhydrazide (which is an unsaturated aliphatic dibasic acid hydrazide) and decamethylene-dicarboxylic acid disalicyloylhydrazide (which is a reaction product of a saturated aliphatic dibasic acid hydrazide with o-oxybenzoic acid).

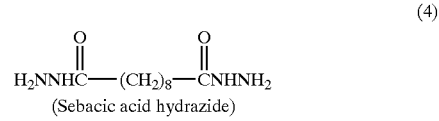

(Sebacic acid hydrazide)

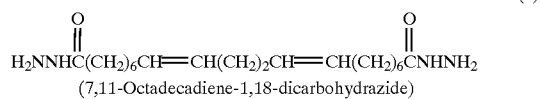

(7,11-Octadecadiene-1,18-dicarbohydrazide)

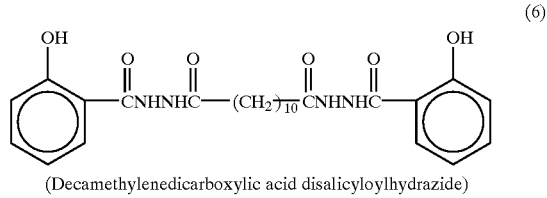

(Decamethylenedicarboxylic acid disalicyloylhydrazide)

(Decamethylenedicarboxylic acid disalicyloylhydrazide)

The dibasic acid hydrazides having a hydantoin skeleton and the hydrazide compounds obtained by a reaction of each one hydrogen atom of the two —NH$_2$ possessed by the above dibasic acid hydrazides, with benzoic acid, o-, m- or p-toluylic acid or o-, m- or p-oxybenzoic acid are represented by the following general formula (7):

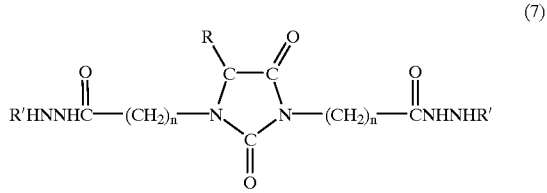

(7)

wherein R is a hydrogen atom or an alkyl group having 1 to 10 carbon atoms; R' is a hydrogen atom or a group represented by

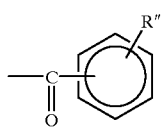

(wherein R" is a hydrogen atom, a methyl group or a hydroxyl group); and n is a number of 1 to 10].

In the following formula (8) is shown the structural formula of 1,3-bis(hydrazinocarboethyl)-5-isopropylhydantoin which is a specific example of the compounds of the formula (7).

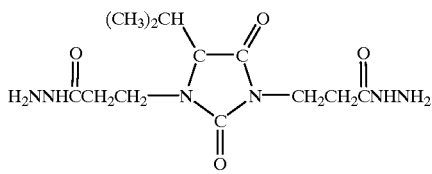
(8)

The phthalic acid hydrazides are shown by the following general formula (9):

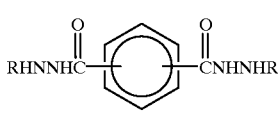
(9)

wherein R has the same definition as R' of the general formula (7).

In the following formula (10) is shown the structural formula of isophthalic acid hydrazide which is a specific example of the compounds of the general formula (9).

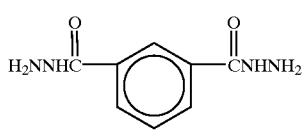
(10)

The carbohydrazide is represented by the following formula (11).

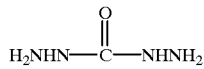
(11)

When a butyl rubber, an ENB type EPDM or a mixture of desired proportions of a butyl rubber and an ENB type EPDM is thermally crosslinked using an alkylphenol-formaldehyde resin and a triazole compound, a higher crosslinking rate is obtained. When, in that crosslinking, a hydrazide compound is also used, (1) an even higher crosslinking rate is obtained; (2) release of the chlorine contained as an impurity in the additives (e.g. clay and carbon black) used, from the crosslinked rubber obtained can be prevented, enabling production of a good rubber product showing no corrosivity for a long time to metals (e.g. copper alloy and aluminum) corrodible by halogen compounds; and (3) the crosslinked rubber product can have an increased hardness without an increase in the amount of carbon black used. Further, according to the crosslinking method of the present invention, it is easy to produce a crosslinked rubber product having an excellent compression set and a hardness of 85 or more in terms of durometer hardness A, and a product (e.g. packing) produced using a mold is provided easily. The crosslinking method of the present invention can achieve the first, second and third objects of the present invention.

In the present invention, crosslinking acceleratability is confirmed by determining a crosslinking curve using an oscillating rheometer. Specifically, the property improvement of a crosslinked rubber according to the present invention can be confirmed by comparing the differences (increases) of hardness and modulus between the above crosslinked rubber and a crosslinked rubber having the same composition except that no crosslinking accelerator is contained. The increased hardness and modulus are very important properties of the crosslinked rubber obtained by the present invention.

The composition containing a butyl rubber, an ENB type EPDM or a mixture of desired proportions of a butyl rubber and an ENB type EPDM, a crosslinking agent and a crosslinking accelerator according to the present invention may further contain, as necessary, additives generally used in rubbers, such as carbon black, filler (e.g. kaolin, clay, mica or calcium carbonate), antioxidant, zinc white, stearic acid and the like.

The additives usable in the present invention are substances added as base materials for improvement in properties such as strength, processability, durability and the like, or substances added for volume or weight increase, cost reduction, etc. Specifically, they are additives generally used by those skilled in the art, such as carbon blacks (e.g. furnace black and thermal black), dry process white carbon, wet process white carbon, kaolinite (clay) or fired clay obtained by firing kaolinite (clay), silane-treated clay obtained by subjecting clay to a surface treatment with a silane coupling agent, calcium carbonate, zinc oxide, magnesium oxide and the like.

Besides, there may be also added, as necessary, an antioxidant, stearic acid, an AC polyethylene, a paraffin wax, a processing aid, etc.

In carrying out the crosslinking of the present invention, the crosslinking conditions are not critical. Ordinarily, however, primary crosslinking is conducted at 170 to 210° C. for 5 to 20 minutes by the use of a hot press used by those skilled in the art. Secondary crosslinking is not necessary depending upon the product obtained; however, when the crosslinked rubber needs to have a superior compression set, a higher hardness, etc., secondary crosslinking is conducted at 170 to 210° C. for 30 minutes to 3 hours.

According to the crosslinking method of the present invention, an accelerated crosslinking rate is obtained in the resin crosslinking of a butyl rubber, an ENB type EPDM or a mixture of desired proportions of a butyl rubber and an ENB type EPDM. As a result, a crosslinked rubber made from a butyl rubber, an ENB type EPDM or a mixture of desired proportions of a butyl rubber and an ENB type EPDM, having a hardness of 85 or more in terms of durometer hardness A, can be easily produced using no halogen compound as a crosslinking co-agent without reduction in electrical insulation; and a crosslinked rubber product of good moldability, low compression set and low corrosivity to metals can be obtained.

The present invention has a feature in that the 3-(N-salicyloyl)amino-1,2,4-triazole used functions as a good crosslinking accelerator in the resin crosslinking of a butyl rubber, an ENB type EPDM or a mixture of desired proportions of a butyl rubber and an ENB type EPDM. The present invention further has a feature in that the combined use of 3-(N-salicyloyl)amino-1,2,4-triazole and a hydrazide compound enables (1) an even higher crosslinking rate, (2) prevention of release of chlorine (contained as impurities in additives such as clay, carbon black and the like) from crosslinked rubber product, and (3) production of crosslinked rubber product of high hardness without increase in carbon black amount used. In the crosslinking method of the present invention, since a butyl rubber and an ENB type EPDM can be mixed in any desired ratio, it is possible to impart the properties of ENB type EPDM to a butyl rubber or the properties of butyl rubber to an ENB type EPDM; therefore, the heat resistance, gas permeability, hardness, tackiness, etc. of crosslinked rubber product can be easily controlled so as to meet the desired levels of these properties.

DESCRIPTION OF THE PREFERRED EMBODIMENTS

The present invention is described in more detail below by way of Examples and Comparative Examples. In the Tables appearing later, the amount of each raw material used in each compound prepared is by parts by weight.

The physical properties of each crosslinked rubber obtained were measured according to JIS K 6251 (tensile testing methods), JIS K 6253 (hardness testing methods), JIS K 6257 (accelerated aging test methods) and JIS K 6262 (permanent set testing methods). Each crosslinking curve was obtained by the torque measurement made using an oscillating rheometer (ASTM 100 type) produced by Toyo Seiki Seisaku-sho, Ltd.

EXAMPLE 1 AND COMPARATIVE EXAMPLE 1

There was prepared a compound of Example 1 having a composition shown in Table 1 and comprising 100 parts by weight of a butyl rubber, 10 parts by weight of an alkylphenol-formaldehyde resin as a crosslinking agent and 2 parts by weight of 3-(N-salicyloyl)amino-1,2,4-triazle (hereinafter abbreviated to triazole) as a crosslinking accelerator. The compound was subjected to primary crosslinking at 190° C. for 15 minutes and then to secondary crosslinking at 200° C. for 2 hours to obtain a crosslinked rubber. The crosslinked rubber was measured for physical properties and the results are shown in Table 2.

For comparison, there was prepared a compound of Comparative Example 1 having a composition shown in Table 1 (the composition was the same as for that of the compound of Example 1 except that no triazole was contained. The compound was subjected to the same crosslinking as for the compound of Example 1 to obtain a crosslinked rubber. The crosslinked rubber was measured for physical properties and the results are shown in Table 2.

Figure 1:
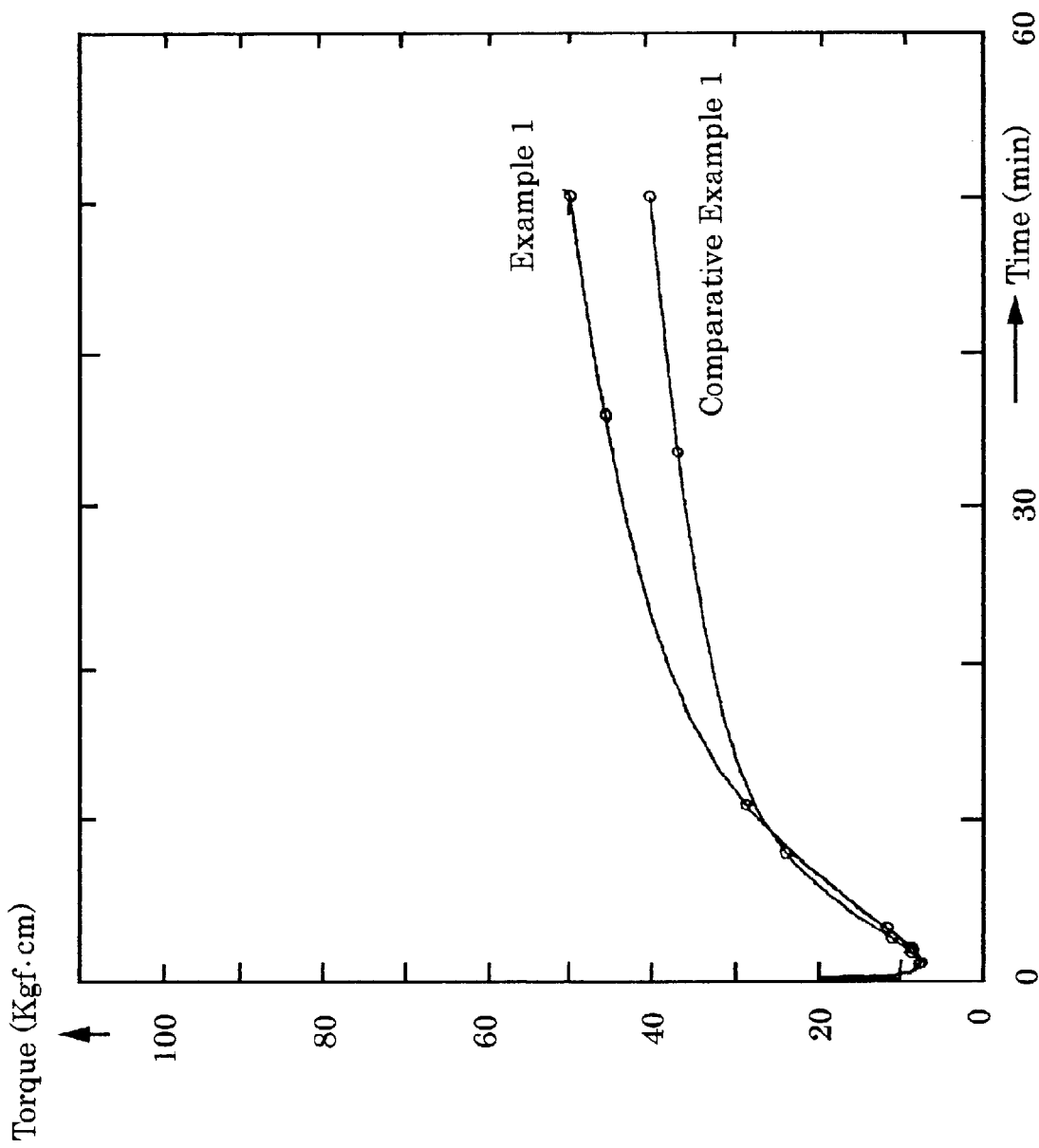
FIG. 1 shows the crosslinking curves of Example 1 and Comparative Example 1 obtained by the torque measurement made at 190° C. by the use of an oscillating rheometer.

Crosslinking curves were obtained for the compounds of Example 1 and Comparative Example 1, by the torque measurement made at 190° C. by the use of an oscillating rheometer, and are shown in FIG. 1.

As is clear from Table 2, the crosslinked rubber of Example 1, as compared with that of Comparative Example 1 produced using no triazole, is significantly high in modulus and also high in hardness. It is also clear from the crosslinking curves of FIG. 1 that triazole is a good crosslinking accelerator in butyl rubber crosslinking with an alkylphenol-formaldehyde resin (hereinafter abbreviated to phenolic resin).

TABLE 1

| Composition of compound | Example 1 | Comparative Example 1 |
| --- | --- | --- |
| Butyl 365 (1) | 100 | 100 |
| SRF carbon (2) | 24 | 24 |
| SRF-LM carbon (3) | 16 | 16 |
| Calcium carbonate | 5 | 5 |
| Fired clay (4) | 95 | 95 |
| Hard clay (5) | 20 | 20 |
| Zinc oxide | 4 | 4 |
| Stearic acid | 1 | 1 |
| Phenolic resin (6) | 10 | 10 |
| Triazole (7) | 2 | — |

Notes for Table 1
(1): Butyl 365, a product of EXXON Kagaku K.K. was used.
(2): Seast S, a product of Tokai Carbon Co., Ltd. was used.
(3): Dia Black N 760M, a product of Mitsubishi Kasei K.K. was used.
(4) Ice Berg, a product of Burges Pigment Co. was used.
(5) Dixie Clay, a product of Vanderbilt Co. was used.
(6) TACKIROL 201, which is an alkylphenol-formaldehyde resin produced by Taoka Chemical Co., Ltd., was used.
(7) CDA-1M, which is 3-(N-salicyloyl)amino-1,2,4-triazole Notes for Table 1

(1) Butyl 365, a product of EXXON Kagaku K.K. was used.

(2) Seast S, a product of Tokai Carbon Co., Ltd. was used.

(3) Dia Black N 760M, a product of Mitsubishi Kasei K.K. was used.

(4) Ice Berg, a product of Burges Pigment Co. was used.

(5) Dixie Clay, a product of Vanderbilt Co. was used.

(6) TACKIROL 201, which is an alkylphenol-formaldehyde resin produced by Taoka Chemical Co., Ltd., was used.

(7) CDA-1M, which is 3-(N-salicyloyl)amino-1,2,4-triazole produced by Asahi Denka K.K., was used.

TABLE 2

|  | Example 1 | Comparative Example 1 |
| --- | --- | --- |
| 300% modulus (Kgf/cm$^2$) | 44 | 32 |
| Increase (%) (1) | +138 | — |
| Tensile strength (Kgf/cm$^2$) | 54 | 55 |
| Elongation (%) | 510 | 700 |
| Durometer A hardness | 77 | 66 |
| Increase (2) | +11 | — |
| I.R.H.D. | 80 | 66 |
| Increase (2) | +14 | — |

Notes for Table 2
(1): [(Modulus at 300% elongation of Example) / (Modulus at 300% elongation of Comparative Example)] × 100 The same applies to other Examples.
(2): (Hardness of Example) − (hardness of Comparative Example) The same applies to other Examples.

Notes for Table 2

(1): [( Modulus at 300% elongation of Example)/ (Modulus at 300% elongation of Comparative Example )]×100 The sample applies to other Examples (Hardness of Example)-(hardness of Comparative Example) The same applies to other Examples.

EXAMPLES 2 TO 3 AND COMPARATIVE EXAMPLES 2 TO 3

Compounds of Examples 2 and 3 each comprising a butyl rubber, a phenolic resin and triazole were each prepared so as to have a composition shown in Table 3. Each compound was crosslinked under the same crosslinking conditions as in Example 1 to obtain a crosslinked rubber. Each crosslinked rubber was measured for physical properties. The results are shown in Table 4.

For comparison, there were prepared a compound of Comparative Example 2 having the same composition as for the compound of Example 2 except no triazole was contained, and a compound of Comparative Example 3 having the same composition as for the compound of Example 3 except that no triazole was contained. The compositions of these compounds are shown in Table 3. The compounds were subjected to the same crosslinking as used in Examples 2 and 3 to obtain crosslinked rubbers; the crosslinked rubbers were measured for physical properties; the results are shown in Table 4.

Figure 2:
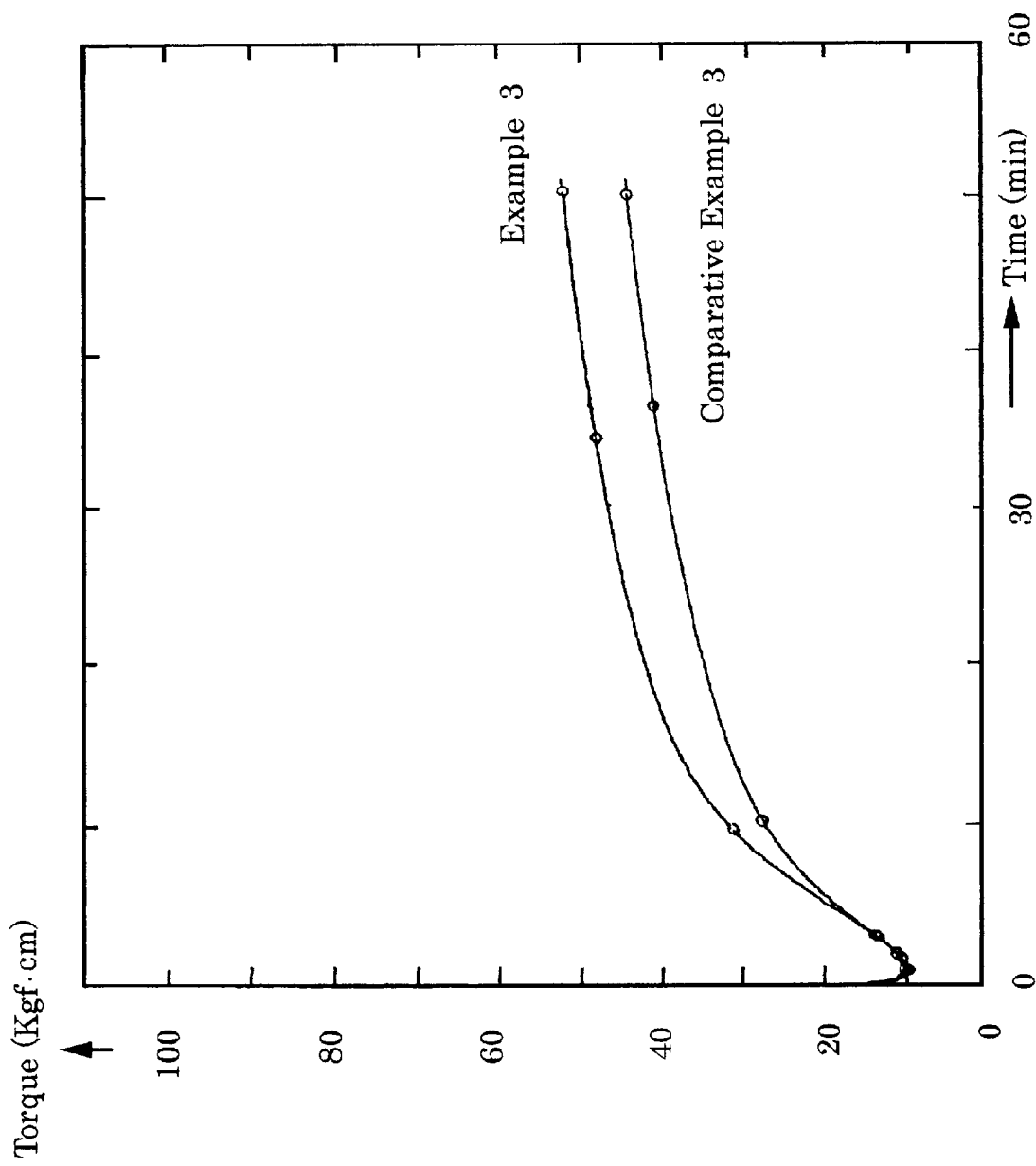
FIG. 2 shows the crosslinking curves of Example 3 and Comparative Example 3 obtained by the torque measurement made at 190° C. by the use of an oscillating rheometer.

Crosslinking curves were obtained for the compounds of Example 3 and Comparative Example 3, by the torque measurement made at 190° C. by the use of an oscillating rheometer, and are shown in FIG. 2.

As is clear from Table 4, when Example 2 and Example 3 are compared with Comparative Example 2 and Comparative Example 3, respectively, there are increases in modulus and hardness and triazole accelerates crosslinking. It is also clear from FIG. 2 that triazole accelerates crosslinking.

TABLE 3

| Composition of compound | Example 2 | Comparative Example 2 | Example 3 | Comparative Example 3 |
| --- | --- | --- | --- | --- |
| Butyl 365 (1) | 100 | 100 | 100 | 100 |
| SRF carbon (2) | 30 | 30 | 12 | 12 |
| SRF-LM carbon (3) | 10 | 10 | 30 | 30 |
| Calcium carbonate | 15 | 15 | 30 | 30 |
| Fired clay (4) | 95 | 95 | 100 | 100 |
| Hard clay (5) | 15 | 15 | 25 | 25 |
| Zinc oxide | 2 | 2 | 3 | 3 |
| Stearic acid | 0.5 | 0.5 | 1 | 1 |
| Phenolic resin (6) | 20 | 20 | 15 | 15 |
| Triazole (7) | 1 | — | 0.5 | — |

Note for Table 3
(1) to (7): The same products as (1) to (7) of Table 1, respectively.

Note for Table 3

(1) to (7): The same products as (1) to (7) of Table 1, respectively.

TABLE 4

| | Example 2 | Comparative Example 2 | Example 3 | Comparative Example 3 |
| --- | --- | --- | --- | --- |
| 300% modulus (Kgf/cm$^2$) | 44 | 36 | 45 | 39 |
| Increase (%) | +123 | — | +115 | — |
| Tensile strength (Kgf/cm$^2$) | 58 | 56 | 59 | 60 |
| Elongation (%) | 470 | 570 | 610 | 710 |
| Durometer A hardness | 76 | 68 | 71 | 68 |
| Increase | +8 | — | +3 | — |

TABLE 4-continued

| | Example 2 | Comparative Example 2 | Example 3 | Comparative Example 3 |
| --- | --- | --- | --- | --- |
| I.R.H.D. | 76 | 68 | 74 | 70 |
| Increase | +8 | — | +4 | — |

EXAMPLES 4 TO 5 AND COMPARATIVE EXAMPLES 4

A compound of Example 4 comprising 100 parts by weight of an ENB type EPDM, 14 parts by weight of a phenolic resin as a crosslinking agent and 1 part by weight of triazole as a crosslinking accelerator, was prepared so as to have a composition shown in Table 5. A compound of Example 5 further comprising 1 part by weight of a hydrazide compound (decamethylenedicarboxylic acid disalicyloylhydrazide), was also prepared so as to have a composition shown in Table 5. Each compound was subjected to primary crosslinking at 200° C. for 15 minutes and then to secondary crosslinking at 200° C. for 3 hours to obtain crosslinked rubbers. Each crosslinked rubber was measured for physical properties, and the results are shown in Table 6. A crosslinking curve was obtained for the compound of Example 4, by the torque measurement made at 190° C. by the use of an oscillating rheometer, and is shown in FIG. 3.

For comparison, a compound of Comparative Example 4 was prepared so as to have the same composition as for the compound of Example 4 except that no triazole was contained. The compound was tried for the same crosslinking and as for Example 4. However, the compound swelled when taken out from the used mold after heat treatment, which indicated no that there was no crosslinking. For confirmation, a crosslinking curve was obtained for the compound of Comparative Example 4, by the torque measurement made at 190° C. by the use of an oscillating rheometer, and is shown in FIG. 3.

Figure 3:
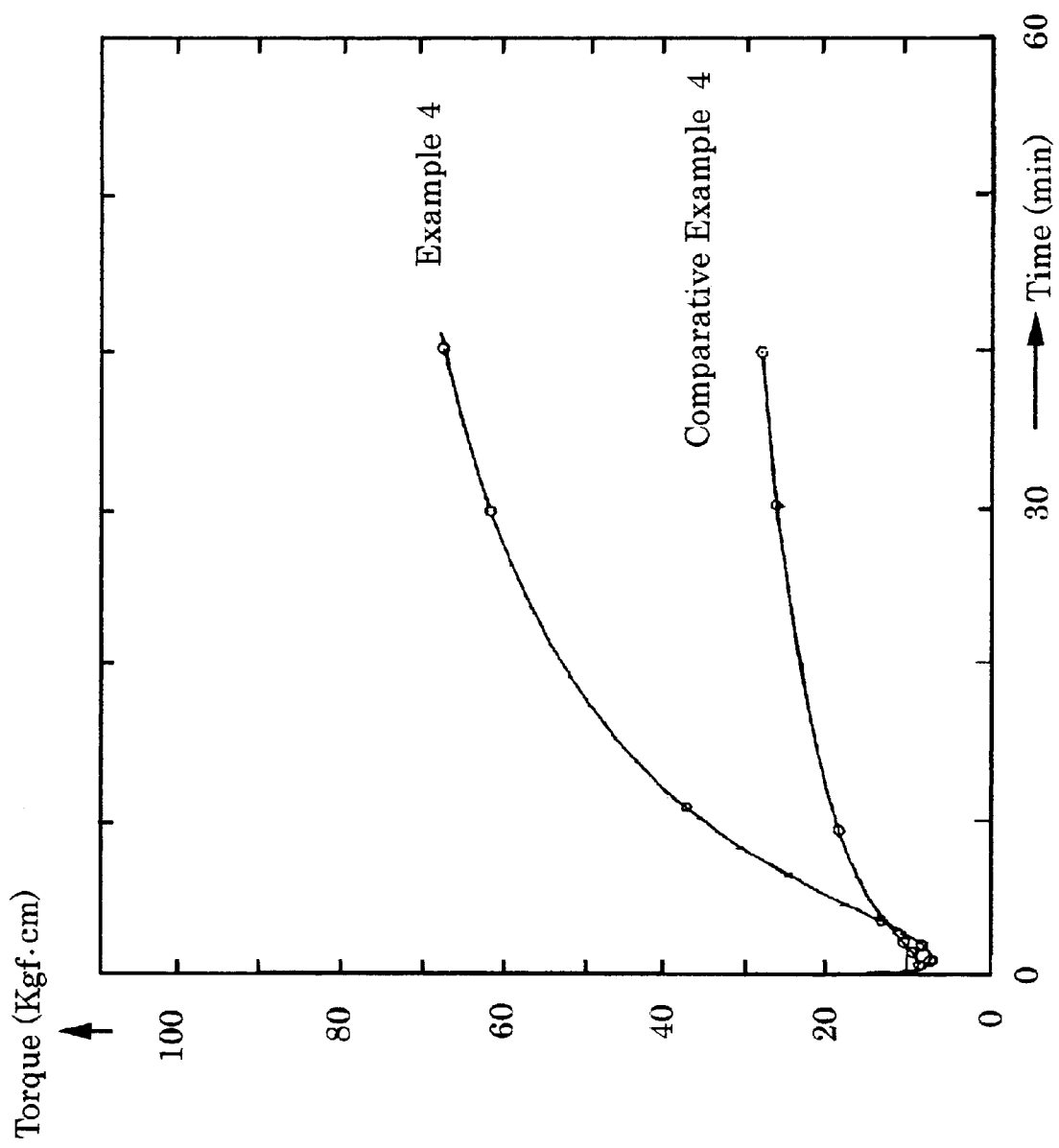
FIG. 3 shows the crosslinking curves of Example 4 and Comparative Example 4 obtained by the torque measurement made at 190° C. by the use of an oscillating rheometer.

As is clear from FIG. 3, slight but insufficient crosslinking of ENB type EPDM is seen in the compound of Comparative Example 4. In contrast, good crosslinking of ENB type EPDM is seen in the compounds of Example 4 and Example 5, each comprising triazole or a combination of triazole and a hydrazide compound.

TABLE 5

| Composition of compound | Example 4 | Example 5 | Comparative Example 4 |
| --- | --- | --- | --- |
| EPT 4045H (1) | 100 | 100 | 100 |
| Hard clay (2) | 50 | 50 | 50 |
| SRF-LM carbon (3) | 25 | 25 | 25 |
| Phenolic resin (4) | 14 | 14 | 14 |
| Triazole (5) | 1 | 1 | — |
| Hydrazide A (6) | — | 1 | — |

Notes for Table 5
(1): An ENB type EPDM produced by Mitsui Chemicals, Inc. was used.
(2), (3), (4), (5): The same products as (5), (3), (6), and (7) of Table 1, respectively.
(6): CDA-6, which is decamethylenedicarboxylic acid disalicyloylhydrazide produced by Asahi Denka Kogyo K.K., was used.

Notes for Table 5

(1): An ENB type EPDM produced by Mitsui Chemicals, Inc. was used.

(2), (3), (4), (5): The same products as (5), (3), (6), and (7) of Table 1, respectively.

CDA-6, which is decamethylenedicarboxylic acid disalicycloylhydrazide produced by Asahi Denka Kogyo K.K., was used.

TABLE 6

|  | Example 4 | Example 5 | Comparative Example 4 |
|---|---|---|---|
| 100% modulus (Kgf/cm$^2$) | 59 | 55 | –(1) |
| Tensile strength (Kgf/cm$^2$) | 99 | 108 | –(1) |
| Elongation (%) | 220 | 230 | –(1) |
| Durometer A hardness | 76 | 78 | –(1) |
| I.R.H.D. | 78 | 78 | –(1) |

Note for Table 6
(1): Measurement was impossible because the compound swelled and was not crosslinked.

Note for Table 6

(1): Measurement was impossible because the compound swelled and was not crosslinked.

EXAMPLES 6 TO 8 AND COMPARATIVE EXAMPLE 5

There were prepared a compound of Example 6 comprising 100 parts by weight of a mixed rubber (consisting of 50 parts by weight of a butyl rubber and 50 parts by weight of an ENB type EPDM), 15 parts by weight of a phenolic resin and 1.2 parts by weight of triazole; a compound of Example 7 comprising 0.4 part by weight of decamethylenedicarboxylic acid disalicyloylhydrazide (a hydrazide compound) in addition to the components of the compound of Example 6; and a compound of Example 8 comprising 0.4 part by weight of dodecanedioic acid dihydrazide (a hydrazide compound) in addition to the components of the compound of Example 6. The compositions of these compounds are shown in Table 7. Each compound was subjected to primary crosslinking at 200° C. for 15 minutes and the physical properties of each resulting crosslinked rubber are shown in Table 8. Then, the crosslinked rubber was subjected to secondary crosslinking at 200° C. for 3 hours and the physical properties of each resulting crosslinked rubber are shown in Table 9. Each crosslinked rubber after secondary crosslinking was also measured for compression set at 125° C. for 72 hours and the value is shown in Table 9.

Figure 4:
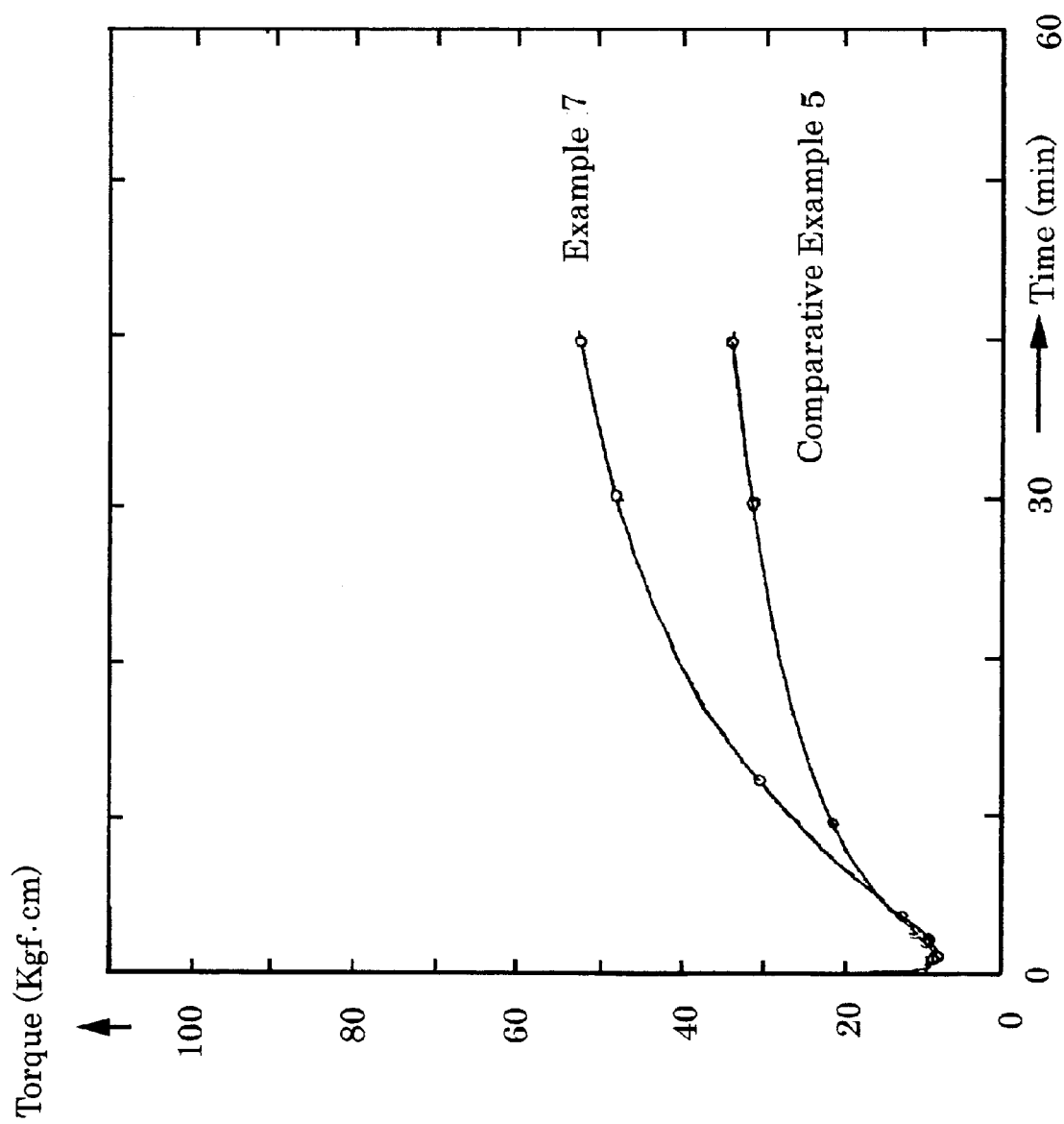
FIG. 4 shows the crosslinking curves of Example 7 and Comparative Example 5 obtained by the torque measurement made at 190° C. by the use of an oscillating rheometer.

A crosslinking curve was obtained for the compound of Example 7, by the torque measurement made at 190° C. by the use of an oscillating rheometer, and is shown in FIG. 4.

For comparison, there was prepared a compound of Comparative Example 5 having the same composition as for the compound of Example 6 except that no triazole was contained. The compound was tried for the same crosslinking (200° C. for 15 minutes) as for the compound of Example 6. However, the compound swelled at the time of taking out from the mold used and showed insufficient crosslinking, and no flat sheet could be obtained (this made it impossible to measure the physical properties of crosslinked rubber). For confirmation of the level of crosslinking, a crosslinking curve was obtained for the compound of Comparative Example 5, by the torque measurement made at 190° C. by the use of an oscillating rheometer, and is shown in FIG. 4.

A is clear from the comparison of Examples 6 to 8 with Comparative Example 5, a mixture of a butyl rubber and an ENB type EPDM, containing a phenolic resin as a crosslinking agent, can be crosslinked satisfactorily when triazole or a combination of triazole and a hydrazide compound is added thereto. As is also clear from the crosslinking curves of Example 7 and Comparative Example 5, shown in FIG. 4, a mixture of a butyl rubber and an ENB type EPDM containing a phenolic resin but neither triazole nor triazole/hydrazide combination is unable to give a crosslinked rubber of practical applicability, and use of triazole or a combination of triazole and a hydrazide compound can give satisfactory crosslinking and can provide a crosslinked rubber having a good compression set.

TABLE 7

| Composition of compound | Example 6 | Example 7 | Example 8 | Comparative Example 5 |
|---|---|---|---|---|
| Butyl 268 (1) | 50 | 50 | 50 | 50 |
| EP21 (2) | 50 | 50 | 50 | 50 |
| SRF carbon (3) | 40 | 40 | 40 | 40 |
| Fired clay (4) | 50 | 50 | 50 | 50 |
| Hard clay (5) | 40 | 40 | 40 | 40 |
| Calcium carbonate | 15 | 15 | 15 | 15 |
| Zinc oxide | 1.5 | 1.5 | 1.5 | 1.5 |
| Stearic acid | 0.5 | 0.5 | 0.5 | 0.5 |
| Phenolic resin (6) | 15 | 15 | 15 | 15 |
| Triazole (7) | 1.2 | 1.2 | 1.2 | — |
| Hydrazide A (8) | — | 0.4 | — | — |
| Hydrazide B (9) | — | — | 0.4 | — |

Notes for Table 7
(1): Butyl 268, a product of EXXON Kagaku K.K. was used.
(2): An ENB type EPDM produced by Japan Synthetic Rubber Co., Ltd. was used.
(3) to (7): The same products as (2), (4), (5), (6) and (7) of Table 1, respectively.
(8): The same product as (6) of Table 5.
(9): N-21, which is dodecanedioic acid dihydrazide produced by Japan Hydrazine Co., Inc., was used.

TABLE 8

|  | Example 6 | Example 7 | Example 8 | Comparative Example 5 |
|---|---|---|---|---|
| 200% modulus (Kgf/cm$^2$) | 57 | 55 | 55 | –(1) |
| Tensile strength (Kgf/cm$^2$) | 75 | 76 | 76 | –(1) |
| Elongation (%) | 350 | 380 | 370 | –(1) |
| Durometer A hardness | 80 | 83 | 85 | –(1) |
| I.R.H.D. | 80 | 83 | 84 | –(1) |

Note for Table 8
(1): Measurement was impossible owing to insufficient cross-linking.

Notes for Table 7

(1): Butyl268, a product of EXXON Kagaku K.K. was used.

(1):An ENB type EPDM produced by Japan Synthetic Rubber Co., Ltd. was used (3) to (7): The same products as (2), (4), (5), (6) and (7) of Table 1, respectively.

(8): The same product as (6) of Table 5.

(9): N-21, which is dodecanedioic acid dihydrazide produced by Japan Hydrazine Co., Inc., was used.

TABLE 9

|  | Example 6 | Example 7 | Example 8 |
|---|---|---|---|
| 200% modulus (Kgf/cm$^2$) | 59 | 59 | 54 |
| Tensile strength (Kg/cm$^2$) | 68 | 75 | 65 |
| Elongation (%) | 190 | 190 | 200 |
| Durometer A hardness | 84 | 83 | 85 |
| I.R.H.D. | 84 | 83 | 84 |

TABLE 9-continued

|  | Example 6 | Example 7 | Example 8 |
|---|---|---|---|
| Compression set (%) (125° C. × 72 hours) | 16 | 17 | 20 |

Notes for Table 8

(1): Measurement was impossible owing to insufficient crosslinking.

EXAMPLES 9 TO 11 AND COMPARATIVE EXAMPLE 6

There were prepared a compound of Example 9 comprising 100 parts by weight of a mixed rubber (consisting of 25 parts by weight of a butyl rubber and 75 parts by weight of an ENB type EPDM), 12 parts by weight of a phenolic resin and 0.6 part by weight of triazole; a compound of Example 10 comprising 0.2 part by weight of dodecanedioic acid dihydrazide and 0.2 part by weight of adipic acid dihydrazide each as a hydrazide compound, in addition to the components of the compound of Example 9; and a compound of Example 11 comprising 0.3 part by weight of decamethylenedicarboxylic acid disalicyloylhydrazide and 0.1 part by weight of 1,3-bis(hydrazinocarboethyl)-5-isopropylhydantoin each as a hydrazide compound, in addition to the components of the compound of Example 9. The compositions of these compounds are shown in Table 10. The compounds were subjected to primary crosslinking at 200° C. for 15 minutes and then to secondary crosslinking at 200° C. for 3 hours to obtain crosslinked rubbers. Each crosslinked rubber was measured for physical properties, and results are shown in Table 11.

For comparison, there was prepared a compound of Comparative Example 6 comprising 100 parts by weight of the same mixed rubber as above and 12 parts by weight of the same phenolic resin as above but comprising no hydrazide compound. The composition of the compound is shown in Table 10. The compound was subjected to the same crosslinking as above and then measured for physical properties. The results are shown in Table 11.

Figure 5:
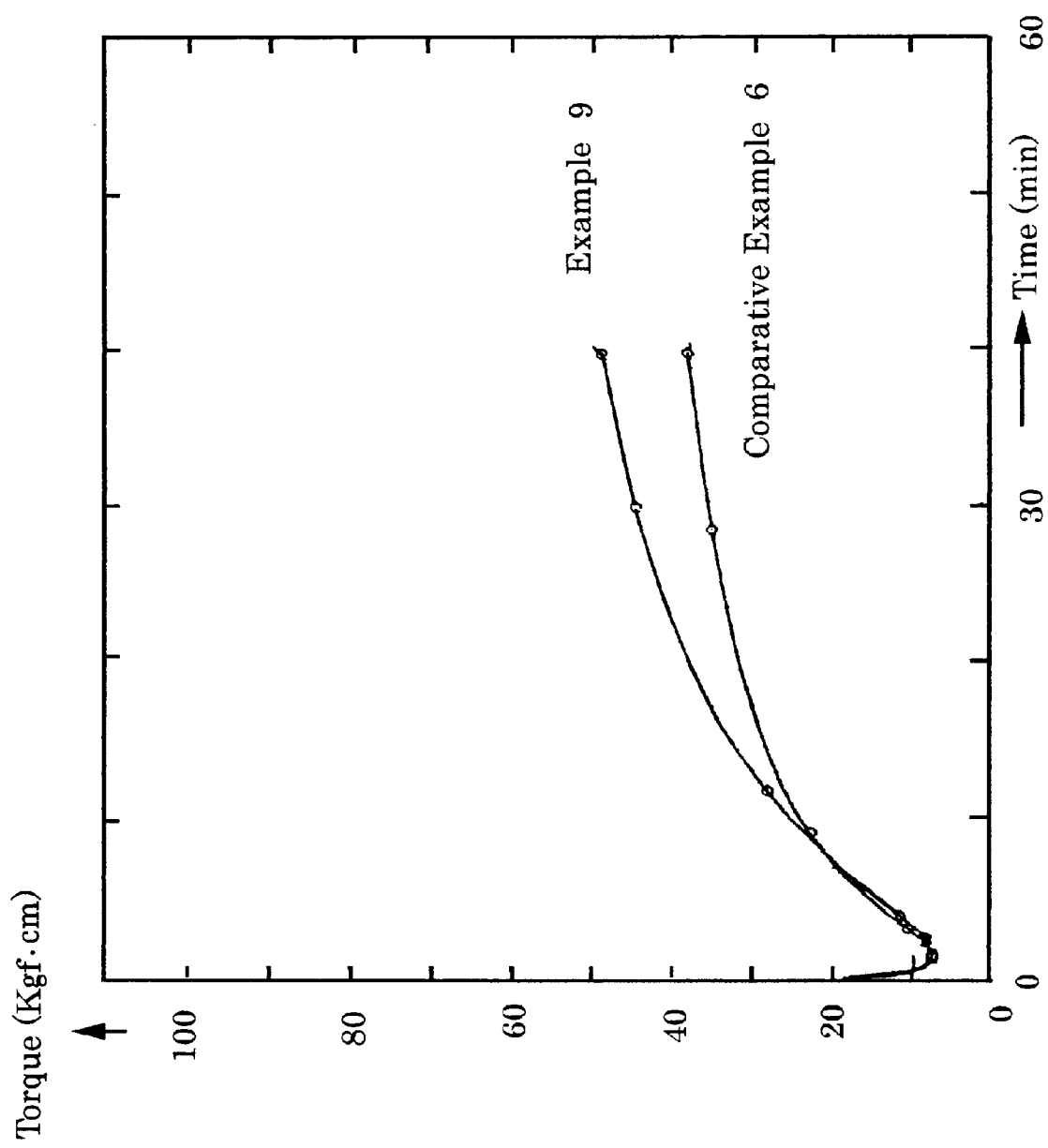
FIG. 5 shows the crosslinking curves of Example 9 and Comparative Example 6 obtained by the torque measurement made at 190° C. by the use of an oscillating rheometer.

Crosslinking curves were obtained for the compound of Example 9 and the compound of Comparative Example 6, by the torque measurement made at 190° C. by the use of an oscillating rheometer, and are shown in FIG. 5.

As is clear from the comparison of Examples 9 to 11 with Comparative Example 6, a mixture of 75% of an ENB type EPDM and 25% of a butyl rubber, containing a phenolic resin as a crosslinking agent, can show accelerated crosslinking and give a crosslinked rubber of significantly increased modulus at 200% elongation and 300% elongation when there is added thereto triazole or a combination of triazole and hydrazide compounds [dodecanedioic acid dihydrazide and adipic acid dihydrazide, or decamethylenedicarboxylic acid disalicyloylhydrazide and 1,3-bis(hydrazinocarboethyl)-5-isopropylhydantoin].

TABLE 10

| Composition of compound | Example 9 | Example 10 | Example 11 | Comparative Example 6 |
|---|---|---|---|---|
| Butyl 268 (1) | 25 | 25 | 25 | 25 |
| EP 21 (2) | 75 | 75 | 75 | 75 |
| SRF carbon (3) | 40 | 40 | 40 | 40 |
| Fired clay (4) | 25 | 25 | 25 | 25 |
| Hard clay (5) | 20 | 20 | 20 | 20 |
| Calcium carbonate | 20 | 20 | 20 | 20 |
| Zinc oxide | 0.7 | 0.7 | 0.7 | 0.7 |
| Stearic acid | 0.3 | 0.3 | 0.3 | 0.3 |
| Phenolic resin (6) | 12 | 12 | 12 | 12 |
| Triazole (7) | 0.6 | 0.6 | 0.6 | — |
| Hydrazide A (8) | — | — | 0.3 | — |
| Hydrazide B (9) | — | 0.2 | — | — |
| Hydrazide ADH (10) | — | 0.2 | — | — |
| Amicure VDH (11) | — | — | 0.1 | — |

Notes for Table 10
(1), (2): The same products as (1) and (2) of Table 7, respectively.
(3) to (7): The same products as (2), (4), (5), (6) and (7) of Table 1, respectively.
(8): The same product as (6) of Table 5.
(9): The same product as (9) of Table 7.
(10): Adipic acid dihydrazide produced by Japan Hydrazine Co., Inc. was used.
(11): 1,3-Bis(hydrazinocarboethyl)-5-isopropylhydantoin produced by Ajinomoto Co., Inc. was used.

Notes for Table 10

(1), (2): The same products as (1) and (2) of Table 7, respectively.

(3) to (7): The same products as (2), (4), (5), (6) and (7) of Table 1, respectively.

(8): The same product as (6) of Table 5.

(9): The same product as (9) of Table 7.

(10): Adipic acid dihydrazide produced by Japan Hydrazine Co., Inc. was used.

(11) 1,3-Bis(hydrazinocarboethyl)-5-isopropylhydantoin produced by Ajinomoto Co., Inc. was used.

TABLE 11

|  | Example 9 | Example 10 | Example 11 | Comparative Example 6 |
|---|---|---|---|---|
| 200% modulus (Kgf/cm$^2$) | 45 | 55 | 51 | 36 |
| Increase (%) | +125 | +152 | +141 | — |
| 300% modulus (Kgf/cm$^2$) | 62 | 70 | 68 | 49 |
| Increase (%) | +126 | +143 | +139 | — |
| Tensile strength (Kgf/cm$^2$) | 103 | 86 | 101 | 102 |
| Elongation (%) | 500 | 400 | 480 | 540 |
| Durometer A hardness | 76 | 77 | 77 | 73 |
| Increase | +3 | +4 | +4 | — |
| I.R.H.D. | 75 | 76 | 77 | 74 |
| Increase | +1 | +2 | +3 | — |

EXAMPLES 12 TO 14 AND COMPARATIVE EXAMPLE 7

There were prepared a compound of Example 12 comprising 100 parts by weight of a mixed rubber (consisting of 75 parts by weight of a butyl rubber and 25 parts by weight of an ENB type EPDM), 20 parts by weight of a phenolic resin and 0.7 part by weight of triazole; a compound of Example 13 comprising 0.4 part by weight of sebacic acid hydrazide as a hydrazide compound, in addition to the components of the compound of Example 12; and a compound of Example 14 comprising 0.7 part by weight of isophthalic acid hydrazide as a hydrazide compound, in addition to the components of the compound of Example 12. The compositions of these compounds are shown in Table 12. Each composition was subjected to primary crosslinking at 200° C. for 15 minutes and then to secondary crosslinking at 185° C. for 3 hours. Each crosslinked rubber was measured for physical properties, and the results are shown in Table 13.

For comparison, there was prepared a compound of Comparative Example 7 having the same composition as for the compound of Example 12 except that no triazole was contained. The compound was subjected to the same crosslinking as above. The crosslinked rubber was measured for physical properties, and the results are shown in Table 13.

Figure 6:
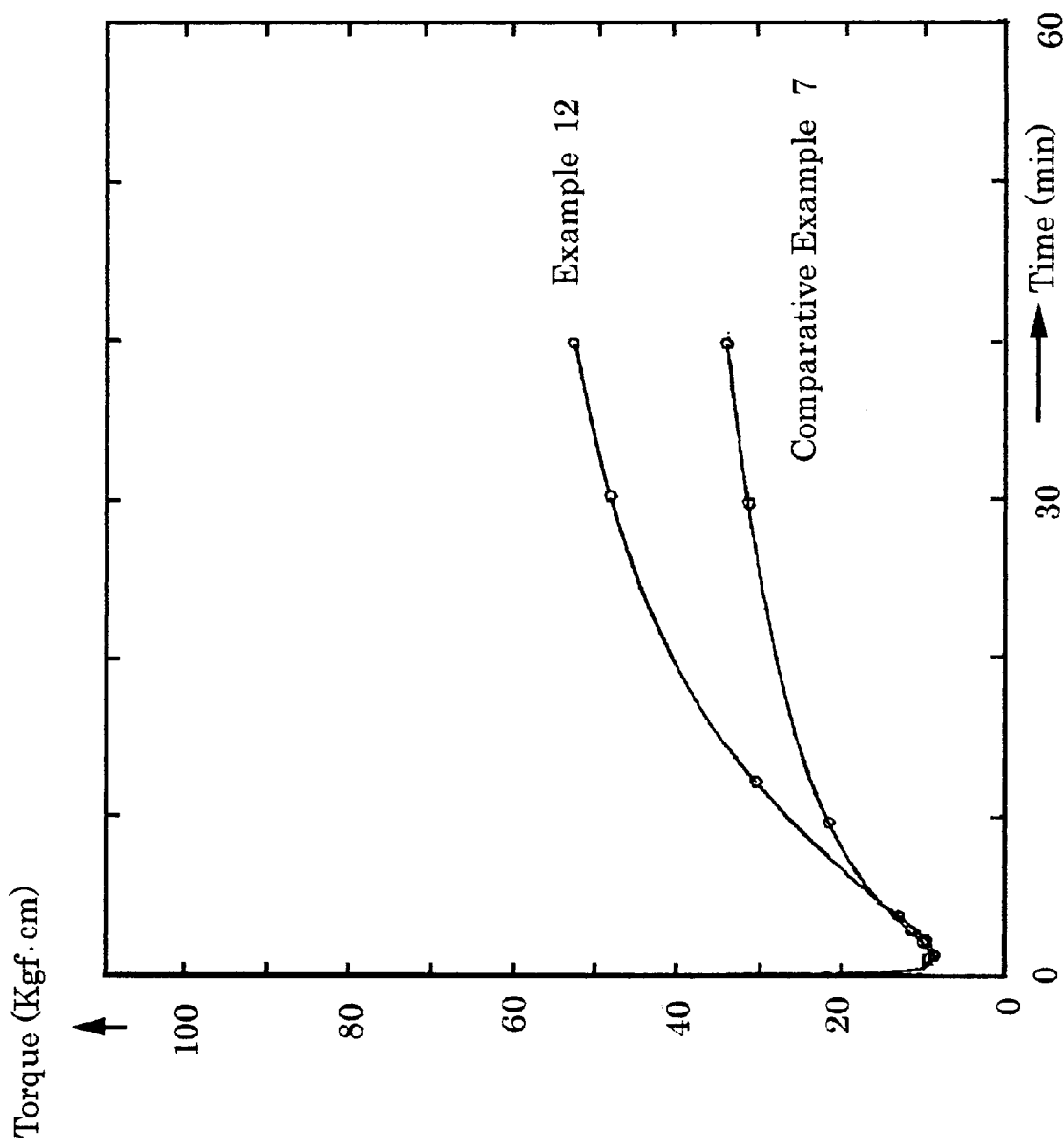
FIG. 6 shows the crosslinking curves of Example 12 and Comparative Example 7 obtained by the torque measurement made at 190° C. by the use of an oscillating rheometer.

Crosslinking curves were obtained for the compound of Example 12 and the compound of Comparative Example 7, by the torque measurement made at 190° C. by the use of an oscillating rheometer, and are shown in FIG. 6.

As is clear from the comparison of Examples 12 to 14 with Comparative Example 7, a mixture of 75% of a butyl rubber and 25% of an ENB type EPDM, containing a phenolic resin as a crosslinking agent, can show accelerated crosslinking and give a crosslinked rubber of increased hardness and significantly increased modulus at 100% elongation when there is added thereto triazole or a combination of triazole and sebacic acid hydrazide or isophthalic acid hydrazide. The accelerated crosslinking is also clear from the comparison of the crosslinking curves of Example 12 and Comparative Example 7, shown in FIG. 6.

TABLE 12

| Composition of compound | Example 12 | Example 13 | Example 14 | Comparative Example 7 |
|---|---|---|---|---|
| Butyl 268 (1) | 75 | 75 | 75 | 75 |
| EP21 (2) | 25 | 25 | 25 | 25 |
| SRF carbon (3) | 40 | 40 | 40 | 40 |
| Fired clay (4) | 75 | 75 | 75 | 75 |
| Hard clay (5) | 20 | 20 | 20 | 20 |
| Calcium carbonate | 10 | 10 | 10 | 10 |
| Zinc oxide | 2 | 2 | 2 | 2 |
| Stearic acid | 0.7 | 0.7 | 0.7 | 0.7 |
| Phenolic resin (6) | 20 | 20 | 20 | 20 |
| Triazole (7) | 0.7 | 0.7 | 0.7 | — |
| Hydrazide SDH (8) | — | 0.4 | — | — |
| Hydrazide IDH (9) | — | — | 0.7 | — |

Notes for Table 12
(1), (2): The same products as (1) and (2) of Table 7, respectively.
(3) to (7): The same products as (2), (4), (5), (6) and (7) of Table 1, respectively.
(8): Sebacic acid hydrazide produced by Japan Hydrazide Co., Inc. was used.
(9): Isophthalic acid hydrazide produced by Japan Hydrazide Co., Inc. was used.

Notes fpr Table 12

(1), (2): The same prudcts as (1) and (2) of Table 7, respectively.

(3): to (7): The same products as (2), (4), (5), (6) and (7) of Table 1, respectively.

(8): Sebacic acid hydrazide produced by Japan Hydrazine Co., Inc. was used (9): Isophthalic acid hydrazide produced by Japan Hydrazine Co., Inc. was used.

TABLE 13

| | Example 12 | Example 13 | Example 14 | Comparative Example 7 |
|---|---|---|---|---|
| 100% modulus (Kgf/cm$^2$) | 46 | 49 | 49 | 32 |
| Increase (%) | +144 | +153 | +153 | — |
| Tensile strength (Kgf/cm$^2$) | 59 | 59 | 61 | 49 |
| Elongation (%) | 220 | 200 | 230 | 250 |
| Durometer A hardness | 84 | 85 | 80 | 78 |
| Increase | +6 | +7 | +2 | — |
| I.R.H.D. | 80 | 84 | 80 | 71 |
| Increase | +9 | +13 | +9 | — |

EXAMPLE 15 AND COMPARATIVE EXAMPLE 8

There were prepared a compound of Comparative Example 8 comprising 100 parts by weight of a butyl rubber and 17.5 parts by weight of a phenolic resin as a crosslinking agent; and a compound of Example 15 further comprising 0.1 part by weight each of three kinds of hydrazide compounds, i.e. isophthalic acid hydrazide (hydrazide IDH), dodecanedioic acid dihydrazide (hydrazide B), adipic acid dihydrazide (hydrazide ADH) and 7,11-octadecadiene-1,18-dicarbohydrazide (Amicure UDH). Their compositions are shown in Table 14. Each compound was subjected to primary crosslinking at 200° C. for 15 minutes to obtain crosslinked rubbers. Each crosslinked rubber was measured for physical properties, and the results are shown in Table 15. Each crosslinked rubber was then subjected to secondary crosslinking at 200° C. for 1.5 hours to obtain final crosslinked rubbers. Each final crosslinked rubber was measured for physical properties, and the results are shown in Table 16.

As is clear from the comparison of Example 15 with Comparative Example 8, a compound comprising a butyl rubber, a phenolic resin and triazole, when further comprising hydrazide compounds, can show accelerated crosslinking and give a crosslinked rubber having an increased hardness and an significantly increased modulus.

TABLE 14

| Composition of compound | Example 15 | Comparative Example 8 |
|---|---|---|
| Butyl 268 (1) | 100 | 100 |
| SRF carbon (2) | 41 | 41 |
| Fired clay (3) | 98 | 98 |
| Calcium carbonate | 5 | 5 |
| Zinc oxide | 2.5 | 2.5 |
| Stearic acid | 0.4 | 0.4 |
| Phenolic resin (4) | 17.5 | 17.5 |
| Triazole (5) | 0.2 | 0.2 |
| Hydrazide IDH (6) | 0.1 | — |
| Hydrazide B (7) | 0.1 | — |
| Hydrazide ADH (8) | 0.1 | — |
| Amicure UDH (9) | 0.1 | — |

Notes for Table 14
(1): The same product as (1) of Table 7.
(2) to (5): The same products as (2), (4), (6) and (7) of Table 1, respectively.
(6): The same product as (9) of Table 12.
(7): The same product as (9) of Table 7.
(8): The same product as (10) of Table 10.
(9): 7, 11-octadecadiene-1, 18-dicarbohydrazide, a product of Ajinomoto Co., Inc. was used.

Notes for Table 14

(1) The same product as (1) of Table 7.

(2) to (5):The same products as (2), (4), (6) and (7) of Table 1, respectively.

(6): The same product as (9) of Table 12.

(7): The same product as (9) of Table 7.

(8): The same product as (10) of Table 10.

(9): 7,11-octadecadiene-1,18-dicarbohydrazide, a product of Ajinomoto Co., Inc. was used.

TABLE 15

|  | Example 15 | Comparative Example 8 |
|---|---|---|
| 100% modulus (Kgf/cm$^2$) | 26 | 16 |
| Increase (%) | +162 | — |
| 300% modulus (Kgf/cm$^2$) | 49 | 37 |
| Increase (%) | +132 | — |
| Tensile strength (Kgf/cm$^2$) | 70 | 69 |
| Elongation (%) | 550 | 600 |
| Durometer A hardness | 70 | 64 |
| Increase | +6 | — |
| I.R.H.D. | 70 | 64 |
| Increase | +6 | — |

TABLE 16

|  | Example 15 | Comparative Example 8 |
|---|---|---|
| 100% modulus (Kgf/cm$^2$) | 37 | 26 |
| Increase (%) | +142 | — |
| 300% modulus (Kgf/cm$^2$) | 60 | 51 |
| Increase (%) | +118 | — |
| Tensile strength (Kgf/cm$^2$) | 64 | 64 |
| Elongation (%) | 340 | 380 |
| Durometer A hardness | 76 | 73 |
| Increase | +3 | — |
| I.R.H.D. | 76 | 70 |
| Increase | +6 | — |

EXAMPLES 16 TO 17 AND COMPARATIVE EXAMPLE 9

There were prepared a compound of Example 16 comprising 100 parts by weight of a butyl rubber, 19 parts by weight of a phenolic resin as a crosslinking agent and 3 parts by weight of triazole; a compound of Example 17 comprising the same amount of the same butyl rubber, the same amount of the same phenolic resin and 4 parts by weight of triazole; and a compound of Comparative Example 9 comprising the same amount of the same butyl rubber and the same amount of the same phenolic resin but no triazole. The compositions of the compounds are shown in Table 17.

Each compound was subjected to primary crosslinking at 200° C. for 15 minutes and then to secondary crosslinking at 200° C. for 2.5 hours to obtain crosslinked rubbers. Each crosslinked rubber was measured for physical properties, and the results are shown in Table 18.

As is clear from the comparison of Examples 16 and 17 with Comparative Example 9, a compound comprising a butyl rubber and a phenolic resin, when further comprising 3 or 4 parts by weight of triazole, can show accelerated crosslinking and give a crosslinked rubber significantly increased in hardness and modulus.

TABLE 17

| Composition of compound | Example 16 | Example 17 | Comparative Example 9 |
|---|---|---|---|
| Butyl 365 (1) | 100 | 100 | 100 |
| SRF carbon (2) | 24 | 24 | 24 |
| SRF-LM carbon (3) | 16 | 16 | 16 |
| Calcium carbonate | 5 | 5 | 5 |
| Fired clay (4) | 95 | 95 | 95 |
| Hard clay (5) | 20 | 20 | 20 |
| Zinc oxide | 4 | 4 | 4 |
| Stearic acid | 0.5 | 0.5 | 0.5 |
| Phenolic resin (6) | 19 | 19 | 19 |
| Triazole (7) | 3 | 4 | — |

Note for Table 17
(1) to (7): The same products as (1) to (7) of Table 1, respectively.

Note for Table 17
(1) to (7): The same products as (1) to (7) of Table 1, respectively

TABLE 18

|  | Example 16 | Example 17 | Comparative Example 9 |
|---|---|---|---|
| 100% modulus (Kgf/cm$^2$) | 50 | 48 | 22 |
| Increase (%) | +227 | +218 | — |
| 200% modulus (Kgf/cm$^2$) | 66 | 72 | 36 |
| Increase (%) | +183 | +200 | — |
| Tensile strength (Kgf/cm$^2$) | 69 | 74 | 56 |
| Elongation (%) | 250 | 240 | 400 |
| Durometer A hardness | 82 | 85 | 72 |
| Increase | +10 | +13 | — |
| I.R.H.D. | 82 | 85 | 66 |
| Increase | +15 | +19 | — |

EXAMPLES 18 AND 22 AND COMPARATIVE EXAMPLE 10

Compounds were prepared so as to comprise 100 parts by weight of a butyl rubber, 17 parts by weight of a phenolic resin, 0.5 part by weight of triazole (these three components were used in all compounds), and, as a hydrazide compound, 0.5 part by weight of sebacic acid hydrazide (Example 18) or 0.2 part by weight of isophthalic acid hydrazide (Example 19) or 0.5 part by weight of dodecanedioic acid dihydrazide (Example 20) or 0.4 part by weight of adipic acid dihydrazide (Example 21) or 0.4 part by weight of 7,11-octadecadiene-1,18-dicarbohydrazide (Example 22). The compositions of these compounds are shown in Table 19. Each compound was subjected to primary crosslinking at 200° C. for 15 minutes and then to secondary crosslinking at 200° C. for 3 hours to obtain crosslinked rubbers. Each crosslinked rubber was measured for physical properties, and the results are shown in Table 20.

For comparison, there was prepared a compound of Comparative Example 10 having the same compositions as for Examples 18 to 22 except that no hydrazide compound was contained. The composition of the compound is shown in Table 19. The compound was subjected to the same crosslinking as above to obtain a crosslinked rubber. The crosslinked rubber was measured for physical properties, and the results are shown in Table 20.

As is clear from the comparison of Examples 18 to 22 with Comparative Example 10, a compound comprising a butyl rubber, a phenolic resin and triazole, when further comprising a hydrazide compound, can show accelerated crosslinking and give a crosslinked rubber increased in modulus and hardness.

TABLE 19

| Composition of compound | Ex. 18 | Ex. 19 | Ex. 20 | Ex. 21 | Ex. 22 | Comp. Ex. 10 |
|---|---|---|---|---|---|---|
| Butyl 268 (1) | 100 | 100 | 100 | 100 | 100 | 100 |
| SRF carbon (2) | 30 | 30 | 30 | 30 | 30 | 30 |
| SRF-LM carbon (3) | 10 | 10 | 10 | 10 | 10 | 10 |
| Calcium carbonate | 6 | 6 | 6 | 6 | 6 | 6 |
| Fired clay (4) | 90 | 90 | 90 | 90 | 90 | 90 |
| Hard clay (5) | 18 | 18 | 18 | 18 | 18 | 18 |
| Zincoxide | 3 | 3 | 3 | 3 | 3 | 3 |
| Stearic acid | 1 | 1 | 1 | 1 | 1 | 1 |
| Phenolic resin (6) | 17 | 17 | 17 | 17 | 17 | 17 |
| Triazole (7) | 0.5 | 0.5 | 0.5 | 0.5 | 0.5 | 0.5 |
| Hydrazide SDH (8) | 0.5 | — | — | — | — | — |
| Hydrazide IDH (9) | — | 0.2 | — | — | — | — |
| Hydrazide B (10) | — | — | 0.5 | — | — | — |
| Hydrazide ADH (11) | — | — | — | 0.4 | — | — |
| Amicure UDH (12) | — | — | — | — | 0.4 | — |

Notes for Table 19
(1): The same product as (1) of Table 7.
(2) to (7): The same products as (2) to (7) of Table 1, respectively.
(8): The same product as (8) of Table 12.
(9): The same product as (9) of Table 12.
(10): The same product as (9) of Table 7.
(11): The same product as (10) of Table 10.
(12): The same product as (9) of Table 14.

Notes for Table 19

(1): The same product as (1) of Table 7.

(2) to (7): The same products as (2) to (7) of Table 1, respectively.

(8): The same product as (8) of Table 12.

(9): The same product as (9) of Table 12.

(10): The same product as (9) of Table 7.

(11): The same product as (10) of Table 10.

(12): The same product as (9) of Table 14.

TABLE 20

| | Ex. 18 | Ex. 19 | Ex. 20 | Ex. 21 | Ex. 22 | Comp. Ex.7 |
|---|---|---|---|---|---|---|
| 100% modulus (Kgf/cm$^2$) | 37 | 35 | 38 | 37 | 42 | 33 |
| Increase (%) | +122 | +106 | +115 | +112 | +127 | — |
| Tensile strength (Kgf/cm$^2$) | 58 | 58 | 57 | 55 | 61 | 65 |
| Elongation (%) | 80 | 320 | 290 | 290 | 280 | 360 |
| Durometer A hardness | 78 | 76 | 78 | 76 | 80 | 74 |
| Increase | +4 | +2 | +4 | +2 | +6 | — |
| I.R.H.D. | 80 | 76 | 78 | 80 | 80 | 72 |
| Increase | +8 | +4 | +6 | +8 | +8 | — |

COMPARATIVE EXAMPLES 11 TO 12

In Comparative Examples 11 and 12, it is shown that 3-amino-1,2,4-triazole having a chemical structure close to that of 3-(N-salicyloyl)amino-1,2,4-triazole has no effect as a crosslinking accelerator in the crosslinking of a butyl rubber or a mixture of a butyl rubber and an ENB type EPDM, with an alkylphenol-formaldehyde resin.

There were prepared a compound of Comparative Example 11 by adding 1 part by weight of 3-amino-1,2,4-triazole to the compound of Comparative Example 5 comprising 100 parts by weight of a mixed rubber (consisting of 50 parts by weight of a butyl rubber and 50 parts by weight of an ENB type EPDM) and 15 parts by weight of a phenolic resin; and a compound of Comparative Example 12 by adding 1 part by weight of 3-amino-1,2,4-triazole to the compound of Comparative Example 9 comprising 100 parts by weight of a butyl rubber and 19 parts by weight of a phenolic resin. The compositions of the compounds of Comparative Examples 5, 11, 9 and 12 are shown in Table 21.

The compound of the compound 11 was subjected to the same crosslinking as for the compound of Comparative Example 5, at 200° C. for 15 minutes. However, no crosslinking took place and foaming occurred. No effect of 3-amino-1,2,4-triazole was seen.

The compound of the compound 12 was subjected to the same crosslinking as for the compound of Comparative Example 5, at 200° C. for 15 minutes. However, no crosslinking took place and foaming occurred. No effect of 3-amino-1,2,4-triazole was seen. It was impossible to obtain a crosslinked rubber intended by the present invention.

These results indicate that the 3-(N-salicyloyl)amino-1,2,4-triazole used in the present invention has a unique crosslinking acceleratability.

TABLE 21

| Composition of compound | Comp. Ex. 5 | Comp. Ex. 11 | Comp. Ex. 9 | Comp. Ex. 12 |
|---|---|---|---|---|
| Butyl 268 (1) | 50 | 50 | — | — |
| EP21 (2) | 50 | 50 | — | — |
| Butyl 365 (3) | — | — | 100 | 100 |
| SRF carbon (4) | 40 | 40 | 24 | 24 |
| SRF-LM carbon (5) | — | — | 16 | 16 |
| Fired clay (6) | 50 | 50 | 95 | 95 |
| Hard clay (7) | 40 | 40 | 20 | 20 |
| Calcium carbonate | 15 | 15 | 5 | 5 |
| Zinc oxide | 1.5 | 1.5 | 4 | 4 |
| Stearic acid | 0.5 | 0.5 | 0.5 | 0.5 |
| Phenolic resin (8) | 15 | 15 | 19 | 19 |
| 3-Amino-1,2,4-triazole (9) | — | 1 | — | 1 |

Notes for Table 21
(1), (2): The same products as (1) and (2) of Table 7, respectively.
(3) to (8): The same products as (1) to (6) of Table 1, respectively.
(9): A chemical produced by Sanwa Chemical Co., Ltd. was used.

Notes for Table 21

(1), (2): The same products as (1) and (2) of Table 7, respectively.

(3) to (8): The same products as (1) to (6) of Table 1, respectively.

(9): A chemical produced by Sanwa Chemical Co., Ltd. was used.

What is claimed is:

1. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, which method comprises adding, to an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, an alkylphenol-formaldehyde resin and 3-(N-salicyloyl)amino-1,2,4-triazole.

2. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, which method comprises adding, to an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, an alkylphenol-formaldehyde resin, 3-(N-salicyloyl)amino-1,2,4-triazole and a hydrazide compound.

3. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, according to claim 1, wherein the alkylphenol-formaldehyde resin is a compound represented by the following general formula (1):

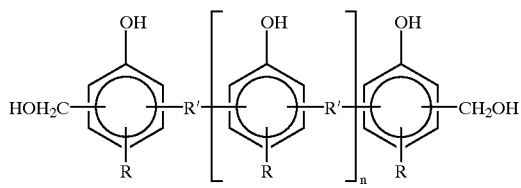
(1)

wherein n is 0 to 10, R is an aliphatic alkyl group having 1 to 10 carbon atoms, and R' is —CH$_2$— or —CH$_2$OCH$_2$—.

4. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, according to claim 2, wherein the hydrazide compound is at least one kind selected from the group consisting of dibasic acid hydrazides represented by the following general formula (3), derived from a saturated or unsaturated aliphatic dicarboxylic acid, dibasic acid hydrazides having a hydantoin skeleton, represented by the following general formula (7), phthalic acid hydrazides represented by the following general formula (9), and carbohydrazide represented by the following formula (11):

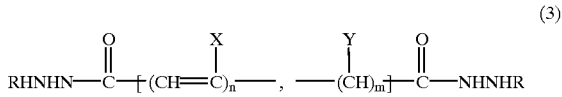
(3)

[wherein X and Y may be the same or different and are each a hydrogen atom or an alkyl group having 1 to 5 carbon atoms; R is a hydrogen atom or a group represented by

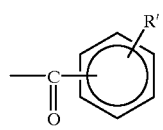

(wherein R' is a hydrogen atom, a methyl group or a hydroxyl group); n is a number of 0 to 2; and m is a number of 0 to 20 (n and m are not 0 simultaneously)],

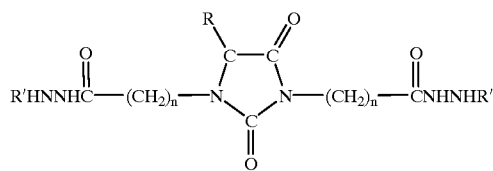
(7)

[wherein R is a hydrogen atom or an alkyl group having 1 to 10 carbon atoms; R' is a hydrogen atom or a group represented by

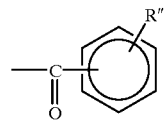

(wherein R" is a hydrogen atom, a methyl group or a hydroxyl group); and n is a number of 1 to 10],

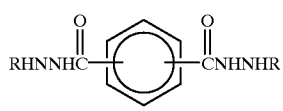
(9)

[wherein R is a hydrogen atom or a group represented by

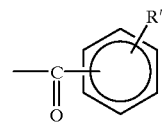

(wherein R' is a hydrogen atom, a methyl group or a hydroxyl group)], and

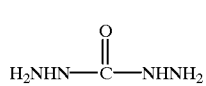
(11)

5. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, according to claim 2, wherein the hydrazide compound is at least one kind selected from the group consisting of carbohydrazide, adipic acid dihydrazide, sebacic acid hydrazide, dodecanedioic acid dihydrazide, isophthalic acid hydrazide, maleic acid hydrazide, decamethylenedicarboxylic acid disalicyloylhydrazide, eicosanedioic acid dihydrazide, 7,11-octadecadiene-1,18-dicarbohydrazide, and 1,3-bis(hydrazinocarboethyl)-5-isopropylhydantoin.

6. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, according to claim 1, wherein 8 to 25 parts by weight of an alkylphenol-formaldehyde resin and 0.1 to 5 parts by weight of 3-(N-salicyloyl)amino-1,2,4-triazole are added to 100 parts by weight of a rubber component which is an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component.

7. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component, according to claim 2, wherein 8 to 25 parts by weight of an alkylphenol-formaldehyde resin, 0.1 to 5 parts by weight of 3-(N-salicyloyl)amino-1,2,4-triazole and 0.1 to 5 parts by weight of at least one kind of hydrazide compound selected from the group consisting of carbohydrazide, adipic acid dihydrazide, sebacic acid hydrazide, dodecanedioic acid dihydrazide, isophthalic acid hydrazide, maleic acid hydrazide, decamethylenedicarboxylic acid disalicyloylhydrazide, eicosanedioic acid dihydrazide, 7,11-octadecadiene-1,18-dicarbohydrazide, and 1,3-bis(hydrazinocarboethyl)-5-isopropylhydantoin are added to 100 parts by weight of a rubber component which is an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component.

8. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to a crosslinking method set forth in claim 7.

9. A method for crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to claim 2, wherein alkylphenolformaldehyde resin is a compound represented by the following general formula (1):

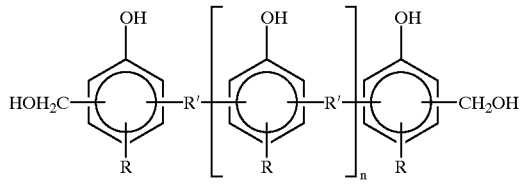

(1)

wherein n is 0 to 10, R is an aliphatic alkyl group having 1 to 10 carbon atoms, and R' —$CH_2$— or —$CH_2OCH_2$—.

10. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 1.

11. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 2.

12. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 3.

13. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 4.

14. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 5.

15. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 6.

16. A crosslinked rubber product obtained by crosslinking an isoprene-isobutylene rubber, an ethylene-propylene-diene rubber containing ethylidenenorbornene as an unsaturated component, or a mixture of an isoprene-isobutylene rubber and an ethylene-propylene-diene rubber containing ethylidenenorbornene as an unsaturated component according to the crosslinking method set forth in claim 9.

* * * * *